(12) United States Patent
Yazaki

(10) Patent No.: US 10,891,529 B2
(45) Date of Patent: Jan. 12, 2021

(54) WIRELESS COMMUNICATION DEVICE

(71) Applicant: Murata Manufacturing Co., Ltd., Nagaokakyo (JP)

(72) Inventor: Hirokazu Yazaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/568,673

(22) Filed: Sep. 12, 2019

(65) Prior Publication Data
US 2020/0034678 A1    Jan. 30, 2020

Related U.S. Application Data

(63) Continuation of application No. PCT/JP2019/012084, filed on Mar. 22, 2019.

(30) Foreign Application Priority Data

Jul. 24, 2018 (JP) ................................. 2018-138518

(51) Int. Cl.
*G06K 19/06* (2006.01)
*G06K 19/07* (2006.01)
(Continued)

(52) U.S. Cl.
CPC ... *G06K 19/0723* (2013.01); *G06K 19/07773* (2013.01); *H01Q 1/2208* (2013.01); *H01Q 9/00* (2013.01)

(58) Field of Classification Search
CPC ........... B65D 81/3446; G06K 19/0715; G06K 19/0723; G06K 19/07773; H01Q 1/2208; H01Q 9/00
See application file for complete search history.

(56) References Cited

U.S. PATENT DOCUMENTS

2004/0130380 A1* 7/2004 Asano ................. H01L 27/0605
327/427
2006/0072355 A1* 4/2006 Ebihara .............. G06K 19/0718
365/149
(Continued)

FOREIGN PATENT DOCUMENTS

JP    2006338563 A    12/2006
JP    2007089054 A     4/2007
(Continued)

OTHER PUBLICATIONS

International Search Report issued for PCT/JP2019/012084, dated May 28, 2019 (Japanese language).

*Primary Examiner* — Thien M Le
(74) *Attorney, Agent, or Firm* — Arent Fox LLP

(57) ABSTRACT

An RFID tag is provided as a wireless communication device that transmits and receives a communication signal. The RFID tag includes a base material, a conductor pattern including an antenna pattern provided at the base material, and a discharge auxiliary electrode. The discharge auxiliary electrode is disposed at a position where the discharge auxiliary electrode overlaps or is close to the antenna pattern in planar view, and lowers a dielectric breakdown voltage between two different opposed portions on the conductor pattern. With this configuration, ignition and combustion is prevented even in a situation in which the RFID tag is subjected to high-frequency power for heating a food item while attached to the food item.

18 Claims, 11 Drawing Sheets

(51) Int. Cl.
  *G06K 19/077* (2006.01)
  *H01Q 9/00* (2006.01)
  *H01Q 1/22* (2006.01)

(56) References Cited

U.S. PATENT DOCUMENTS

| | | | |
|---|---|---|---|
| 2006/0097059 A1* | 5/2006 | Miyazaki | G06K 19/077 |
| | | | 235/492 |
| 2007/0132593 A1 | 6/2007 | Yamazaki | |
| 2010/0123582 A1 | 5/2010 | Smith et al. | |
| 2010/0141451 A1* | 6/2010 | Lian | G08B 13/2431 |
| | | | 340/572.3 |
| 2010/0141452 A1* | 6/2010 | Lian | G06K 19/07345 |
| | | | 340/572.3 |
| 2010/0209744 A1* | 8/2010 | Kim | H01M 10/0436 |
| | | | 429/8 |
| 2014/0202411 A1* | 7/2014 | Ikeda | F02P 23/045 |
| | | | 123/143 B |
| 2014/0240184 A1* | 8/2014 | Andle | G01R 29/0878 |
| | | | 343/720 |

FOREIGN PATENT DOCUMENTS

| | | |
|---|---|---|
| JP | 2007164528 A | 6/2007 |
| JP | 2011521457 A | 7/2011 |

\* cited by examiner

λ/4 Resonance fo

λ/2 Resonance 2fo

3λ/4 Resonance 3fo

λ Resonance 4fo

WIRELESS COMMUNICATION DEVICE

CROSS REFERENCE TO RELATED APPLICATIONS

The present application is a continuation of PCT/JP2019/012084 filed Mar. 22, 2019, which claims priority to Japanese Patent Application No. 2018-138518, filed Jul. 24, 2018, the entire contents of each of which are incorporated herein by reference.

TECHNICAL FIELD

The present invention relates to a wireless communication device including an antenna, and, more particularly, to a wireless communication device such as an RFID (Radio Frequency Identification) tag that conducts near field communication through an induced electromagnetic field or an electromagnetic wave.

BACKGROUND

An RFID tag can be used as a wireless communication device in various situations because the RFID tag communicates with a reader and writer, and the reader and writer performs reading and writing of predetermined information in a noncontact manner. For example, so-called self-checkout can smoothly be performed by attaching the RFID tag to all products. Additionally, management of sales and distribution conditions such as securing of traceability and marketing is smoothly performed.

On the other hand, a wide variety of products are handled in stores such as a convenience store and a supermarket, and among food items as products, there are some products that are heated immediately after the products are purchased, to be taken out, or to be immediately eaten or drunk on the spot by a purchaser. For example, sometimes a lunch box or a prepared dish is heated at a store using an electromagnetic wave heating device, such as a microwave oven.

However, when the product to which the RFID tag is attached is heated using the microwave oven, sometimes the following problems arise.

Specifically, an LF band of 135 kHz or less, an HF band such as 13.56 MHz, a UHF band such as a band of 860 MHz to 960 MHz, and a microwave band such as 2.45 GHz are mainly used as a frequency of a communication signal of the RFID tag. Currently, the RFID tag of the type attached to the food items is the RFID tag in which the UHF band is used. In the RFID tag in which the UHF band is used, a metal material such as an antenna pattern that is a metal film body is provided on a base material such as paper or resin together with a Radio-Frequency Integrated Circuit (RFIC) element.

When the product to which the RFID tag is attached is heated in the microwave oven, energy of an electromagnetic wave from the microwave oven is absorbed by the RFID tag together with the product. Consequently, there is a risk that the RFID tag or a portion of the product to which the RFID tag is attached may ignite due to, for example, one or more of the following reasons:

discharge at a place where electric field strength is enhanced in the metal material;
  heat generation and sublimation of the metal material due to an overcurrent flowing in the metal material; and
  heat generation of the base material of the RFID tag.

In particular, since a high-power electromagnetic wave of about 3 kW is radiated inside the chamber of the microwave oven installed in the convenience store, and the RFID tag is heated at once immediately after the start of heating, there is a high risk of the ignition depending on conditions.

A configuration of a flame-retardant tag is proposed in Patent Literature 1 in order to reduce the risk of ignition in the RFID tag.

Patent Literature 1: Japanese Patent Unexamined Publication No. 2006-338563.

The flame-retardant tag disclosed in Patent Literature 1 is one in which the base material on which an IC chip and an antenna pattern are mounted is made of a flame-retardant material. For this reason, combustion of the base material is prevented. However, the metal material provided on the base material has a high possibility of temporally continuous discharge, and no configuration that can surely prevent the risk of ignition of the base material and the possibility that the product catches fire is provided.

SUMMARY OF THE INVENTION

Accordingly, it is an object of the present invention is to provide a wireless communication device configured to prevent ignition and combustion even when the wireless communication device is subjected to high-frequency power for heating a food items while attached to the food items or the like.

According to one exemplary aspect of the present invention, a wireless communication device is provided that transmits and receives a communication signal and that includes a base material; a conductor pattern including an antenna pattern provided at the base material; and a discharge auxiliary electrode disposed at a position where the discharge auxiliary electrode overlaps or is close to the antenna pattern in planar view. As such, a dielectric breakdown voltage between two different opposed portions is lowered on the conductor pattern.

With the above structure, the discharge auxiliary electrode lowers the dielectric breakdown voltage at the position where the discharge auxiliary electrode is disposed. For this reason, when the irradiation of high-frequency power of the electromagnetic wave heating microwave band is performed, the discharge auxiliary electrode efficiently generates and controls the discharge at the place where a potential difference is generated in the antenna pattern, so that the antenna pattern is quickly cut at the position thereof that is close to the discharge auxiliary electrode. When the antenna pattern is cut, the potential difference at the discharge position disappears or decreases, the discharge is not maintained, and the ignition of the antenna pattern and the base material does not occur. In this manner, melting and deformation of the wireless communication device or the portion of the product to which the wireless communication device is attached is also prevented.

According to the present invention, a wireless communication device is provided that is configured to prevent the ignition and combustion even when the wireless communication device is subjected to the high-frequency power for heating the food items while attached to the food items or the like.

DETAILED DESCRIPTION OF EXEMPLARY EMBODIMENTS

Figure 1A:
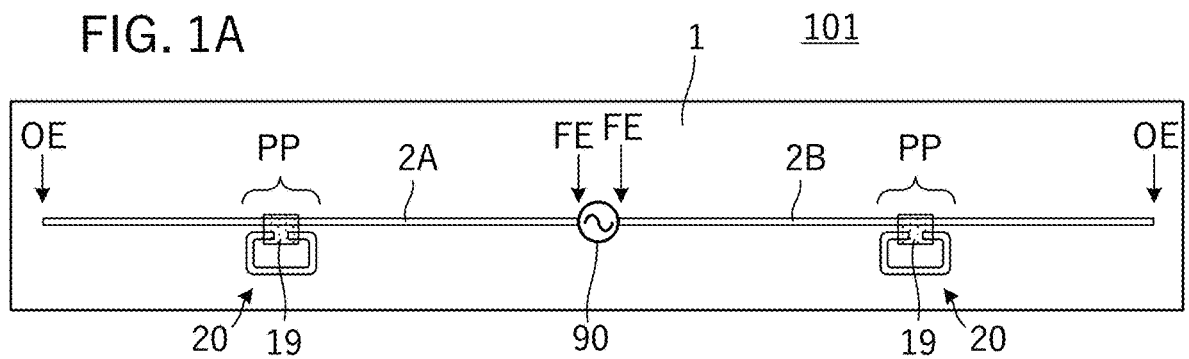
FIG. 1A is a plan view illustrating an RFID tag 101 according to a first exemplary embodiment.

First, configurations of various exemplary aspects in the wireless communication device according to the present invention will be described.

According to a first exemplary aspect, a wireless communication device is provided that transmits and receives a communication signal and that includes abase material; a conductor pattern including an antenna pattern provided at the base material; and a discharge auxiliary electrode disposed at a position where the discharge auxiliary electrode overlaps or is close to the antenna pattern in planar view. Moreover, a dielectric breakdown voltage between two different opposed portions is lowered on the conductor pattern.

In the wireless communication device of the first exemplary aspect, the discharge auxiliary electrode is provided at the place where the large potential difference is generated in the antenna pattern when the wireless communication device is subjected to the irradiation of the microwave in the chamber of the microwave oven. Consequently, the controlled discharge occurs at the place and the position of the antenna pattern adjacent to the discharge auxiliary electrode is quickly cut by the discharge. When the antenna pattern is cut, the potential difference at the discharge position disappears or decreases, the discharge is not maintained, and heat generation due to the discharge is not continued. For this reason, the antenna pattern and the base material do not ignite, and melting and deformation of the wireless communication device or the portion of the product to which the wireless communication device is attached can also be prevented.

According to the second exemplary aspect, in the wireless communication device, the discharge auxiliary electrode is provided at a place where resonance of the antenna pattern in a frequency band of an electromagnetic wave heating microwave having power higher than power of the communication signal is stopped due to the antenna pattern being cut at a proximity position of the discharge auxiliary electrode. With this configuration, when the antenna pattern is cut at the proximity position of the discharge auxiliary electrode, the antenna pattern immediately stops the heat generation due to the resonance at the frequency of the electromagnetic wave heating microwave band, so that temperature rise is effectively reduced.

According to the third exemplary aspect, in the wireless communication device, a frequency of the communication signal is a UHF-band frequency, and a frequency of the electromagnetic wave heating microwave is a frequency ranging from 2.4 GHz to 2.5 GHz inclusive. With this configuration, for example, the antenna pattern tends to resonate at a quarter wavelength at the frequency of the communication signal and to generate harmonic resonance at the electromagnetic wave heating microwave band, so that the heating due to high power of the electromagnetic wave heating microwave band can effectively be reduced.

According to a fourth exemplary aspect, in the wireless communication device, the discharge auxiliary electrode is provided at a position, where the electric field strength is high among positions between portions of the antenna pattern, while the wireless communication device is subjected to irradiation of the electromagnetic wave heating microwave having the power higher than power of the communication signal. With this configuration, the discharge is reliably performed by the action of the discharge auxiliary electrode, and the antenna pattern can be cut more quickly.

According to a fifth exemplary aspect, in the wireless communication device, the discharge auxiliary electrode is provided over a whole area in which the antenna pattern is provided. With this configuration, the antenna pattern is more quickly cut because the discharge quickly occurs at the place where the dielectric strength is weakest in the antenna pattern.

According to a sixth exemplary aspect, in the wireless communication device, the conductor pattern further includes a loop-shaped conductor disposed close to the antenna pattern, and the discharge auxiliary electrode is disposed to overlap or be close to an open portion of the loop-shaped conductor in the planar view. With this configuration, the discharge is reliably performed in the open portion of the loop-shaped conductor, so that the antenna pattern is quickly cut at the position thereof that is close to the open portion.

According to a seventh exemplary aspect, in the wireless communication device, the discharge auxiliary electrode is provided in a region continuous with the antenna pattern and an area in which the loop-shaped conductor is provided. With this configuration, the number of places where the antenna pattern can be cut by the heat generation due to the discharge is increased, and the antenna pattern is efficiently cut.

According to an eighth exemplary aspect, in the wireless communication device, the antenna pattern has a meandering line shape, and the loop-shaped conductor is disposed between mutually-opposed conductor patterns of the antenna pattern. With this configuration, it is not necessary to secure a region where only the loop-shaped conductor is provided, and the overall size is not enlarged.

According to a ninth exemplary aspect, in the wireless communication device, the discharge auxiliary electrode is provided on the antenna pattern. With this configuration, because the discharge position is closer to the antenna pattern, the antenna pattern is cut more quickly.

According to a tenth exemplary aspect, in the wireless communication device, the discharge auxiliary electrode is provided between the antenna pattern and the base material. With this configuration, because the discharge position is closer to the antenna pattern, the antenna pattern is cut more quickly.

A convenience store and a supermarket that sell a product to which a wireless communication device is attached handle a wide variety of products such as food items and household goods. In recent years, various experiments have been conducted toward practical application of an "unmanned" convenience store that automates accounting and packing of the purchased product.

In order to automate the accounting of the product in the "unmanned" convenience store, it is considered that the RFID tag provided as a wireless communication device is attached to all the products. In the "unmanned" convenience store, a system is provided in which information from the RFID tag is read to display a product price when a shopping basket, which accommodates the product with the RFID tag, is placed on a checkout table. A purchaser inserts cash for the product price into a cash slot or inserts a credit card to complete payment, and receives the product automatically packed in a shopping bag, whereby the purchase of the product can be completed in the "unmanned" convenience store.

Hereinafter, exemplary embodiments that are a specific illustration of a wireless communication device according to the present invention will be described with reference to the attached drawings. As the product to which the wireless communication device of the present invention is attached, all products handled in a store, such as a so-called convenience store and supermarket are considered as would be appreciated to one skilled in the art.

Although a microwave oven that performs dielectric heating will be described as the electromagnetic wave heating device described in the following embodiments, a heating device having a function of performing dielectric heating is considered as the electromagnetic wave heating device of the present invention. Further, in the following embodiments, an RFID tag attached to the product will be described as an example of the wireless communication device.

First Exemplary Embodiment

Figure 1B:
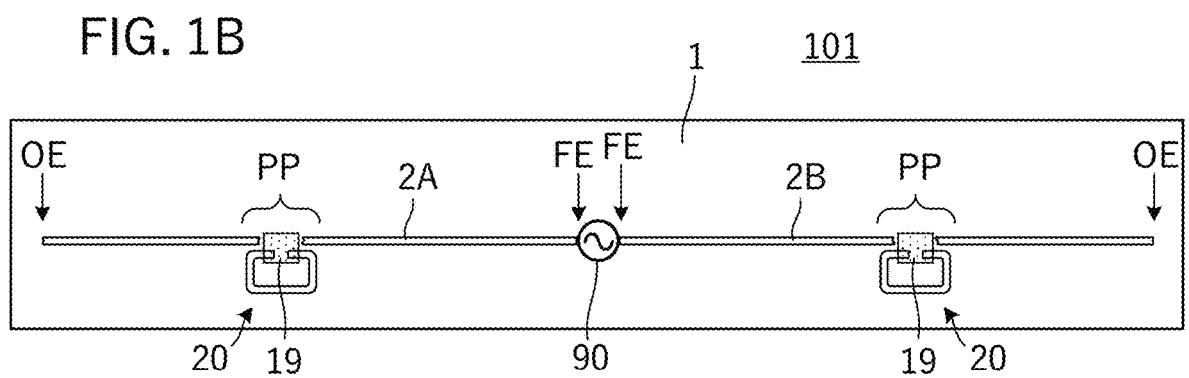
FIG. 1B is a plan view illustrating the RFID tag 101 in a state after a part of an antenna pattern is cut.
Figure 1C:
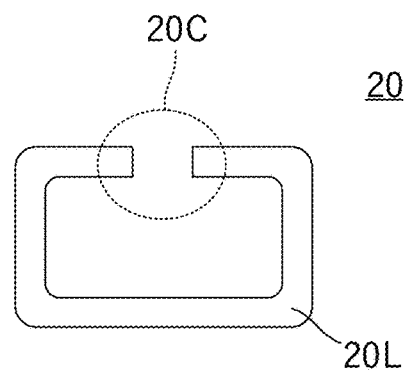
FIG. 1C is an enlarged plan view of a loop-shaped conductor.

FIG. 1A is a plan view illustrating an RFID tag 101 according to a first exemplary embodiment, and FIG. 1B is a plan view illustrating the RFID tag 101 in a state after a part of an antenna pattern is cut. FIG. 1C is an enlarged plan view of a loop-shaped conductor.

As illustrated in FIG. LA, the RFID tag 101 includes a base material 1 made of an insulator or a dielectric, antenna patterns 2A, 2B provided on the base material 1, and a feeding circuit 90 that supplies power to the antenna patterns 2A, 2B. The antenna patterns 2A, 2B are a part of a conductor pattern of the exemplary aspect of the present invention.

The RFID tag 101 of the present embodiment is configured to conduct wireless communication (i.e., transmission and reception) using a high-frequency signal having a frequency (carrier frequency) of a communication signal in a UHF band. The UHF band is a frequency band of 860 MHz to 960 MHz. Here, the frequency of the communication signal in the UHF band is an example of a frequency of a communication signal in the present disclosure.

For example, the feeding circuit 90 is an RFIC element, an RFIC package, or the like, which is discussed below. In the RFID tag 101 of the present embodiment, a flexible film material or a flame-retardant film material is used as the base material 1. An outline of the base material 1 has a rectangular shape in planar view. When the base material 1 is a normal film material that is not flame-retardant, a thickness of the base material 1 may be less than or equal to 38 μm. Consequently, the base material 1 melts and deforms before burning, so that the shape of the base material cannot be maintained.

When the flame-retardant film is used as the base material 1, for example, a film in which a halogen-based flame-retardant material is added to a resin material such as a PET (polyethylene terephthalate) resin and a PPS (polyphenylene sulfide) resin or a film in which such a resin material is coated with a flame-retardant coating material is used as aflame-retardant film material to be used. A resin material, such as heat-resistant PEN (polyethylene naphthalate) resin, which has high functions in terms of heat resistance, hydrolysis resistance and chemical resistance, can also be used as a material for the base material 1. A flame-retardant material is not necessarily needed for the base material 1. Alternatively, for example, the base material 1 can be made of a paper material.

The antenna patterns 2A, 2B and a loop-shaped conductor 20 are disposed on the surface of the base material 1. The feeding circuit 90 is electrically connected to the antenna patterns 2A, 2B provided on the surface of the base material 1. It is noted that the loop-shaped conductor 20 is a part of the conductor pattern of the exemplary embodiment.

The antenna patterns 2A, 2B and the loop-shaped conductor 20 are a metal material, such as an aluminum foil and a copper foil, which has high conductivity. In addition to the metal material, a carbon-based material may be used as the antenna patterns 2A, 2B and the loop-shaped conductor 20.

As illustrated in FIG. 1A, the antenna patterns 2A, 2B extend from the feeding circuit 90 in opposite directions. The antenna patterns 2A, 2B are patterns forming a dipole type electric field antenna. In the antenna patterns 2A, 2B, the feeding circuit 90 is connected to a feeding circuit connection end FE, and a leading end is an open end OE.

The RFID tag 101 includes the loop-shaped conductors 20 close to predetermined proximity positions PP of the antenna patterns 2A, 2B. As illustrated in FIG. 1C, the loop-shaped conductor 20 is a loop-shaped pattern of which a part is open. That is, the loop-shaped conductor 20 is constructed with a conductor 20L and an open portion 20C. In the loop-shaped conductor 20, an LC circuit is constructed with a stray capacitance component provided in the open portion 20C and an inductance component of the conductor 20L.

The loop-shaped conductor 20 is provided on the base material 1 such that the open portion 20C is brought close to the antenna patterns 2A, 2B. A discharge auxiliary electrode 19 is disposed at a position where the discharge auxiliary electrode 19 overlaps the open portion 20C of the loop-shaped conductor 20 and a part of the antenna patterns 2A, 2B adjacent to the open portion 20C in planar view.

According to the exemplary aspect, the discharge auxiliary electrode 19 is a layer or a film containing particulate conductive materials dispersed in an insulation material forming a base material. For example, the conductive particles are metal particles such as Cu or semiconductor particles such as SiC. Moreover, insulating particles can be dispersed together with the conductive particles. The discharge auxiliary electrode 19 lowers a dielectric breakdown voltage of the open portion 20C of the loop-shaped conductor 20, and lowers a start voltage (i.e., the dielectric strength) of creeping discharge or the discharge in the insulator.

When the RFID tag 101 is irradiated with the electromagnetic wave heating microwave, the loop-shaped conductor 20 is subjected to the microwave to generate a large potential difference in the open portion 20C of the loop-shaped conductor 20. When the dielectric strength of the open portion 20C (i.e., the dielectric breakdown voltage between two opposed points of the conductor portion 20L) shown in FIG. 1C is exceeded, the dielectric breakdown is generated and the discharge is started in the open portion 20C.

When the discharge occurs in the open portion 20C, energy is concentrated on the discharge portion, so that the discharge portion has high heat, and the loop-shaped conductor 20, the antenna patterns 2A, 2B adjacent to the loop-shaped conductor 20, and the base material 1 are heated. The antenna patterns 2A, 2B and the base material 1 are heated, so that the antenna patterns 2A, 2B are melted and cut or sublimated and cut at the proximity position PP. FIG. 1B illustrates the state after the antenna patterns 2A, 2B are cut off at the proximity position PP.

As illustrated in FIG. 1B, when the antenna patterns 2A, 2B are cut at the proximity position PP of the loop-shaped conductor 20, effective lengths of the antenna patterns 2A, 2B are shortened, and the resonance is not generated at the frequency of the electromagnetic wave heating microwave band. Thus, even when the irradiation of the electromagnetic wave heating microwave continues, a resonance current due to the microwave does not flow in the antenna patterns 2A, 2B, the temperature rise stops, and the ignition (i.e., combustion) can be prevented.

In the present embodiment, the loop-shaped conductor 20 resonates at the frequency of the electromagnetic wave heating microwave that is higher than the frequency of the communication signal. That is, the loop-shaped conductor 20 is configured and acts as an LC resonance circuit. As described above, in this example, the frequency of the communication signal is in a frequency band of 860 MHz to 960 MHz, and the frequency of the electromagnetic wave heating microwave is a frequency of 2.4 GHz to 2.5 GHz inclusive, for example.

As illustrated in FIG. 1A, because the loop-shaped conductor 20 is close to the antenna patterns 2A, 2B, the loop-shaped conductor 20 resonates at the frequency of the electromagnetic wave heating microwave, whereby the voltage generated in the open portion 20C is proportional to a Q value of a resonator. Thus, the applied power of the electromagnetic wave heating microwave necessary for occurrence of the discharge in the open portion 20C is reduced. In other words, the discharge is quickly started in the open portion 20C immediately after the irradiation of the electromagnetic wave heating microwave is started.

Examples of a resonance mode at the frequency of the communication signal and a resonance mode at the frequency of the electromagnetic wave heating microwave in the antenna patterns 2A, 2B will be illustrated with reference to FIGS. 2A, 2B, 2C, and 2D. FIGS. 2A, 2B, 2C, and 2D illustrate the examples of the resonance mode at the frequency of the communication signal or the resonance mode at the frequency of the electromagnetic wave heating microwave in terms of a current distribution and a voltage distribution. In the resonance mode in FIG. 2A, fundamental resonance is generated at a resonance frequency fo and at a quarter wavelength from a feeding end to an open end. In the resonance mode in FIG. 2B, harmonic resonance is generated at a resonance frequency 2fo and at a half wavelength from the feeding end to the open end. In the resonance mode in FIG. 2C, the harmonic resonance is generated at a resonance frequency 3fo and at a three-quarter wavelength from the feeding end to the open end. In the resonance mode in FIG. 2D, the harmonic resonance is generated at a resonance frequency 4fo and at one wavelength from the feeding end to the open end.

Figure 2A:
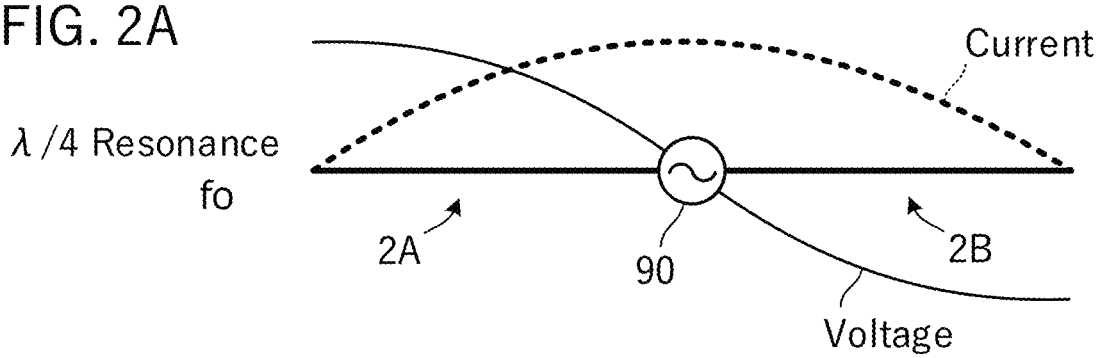
FIGS. 2A, 2B, 2C, and 2D illustrate an example of a resonance mode at a frequency of a communication signal or a resonance mode at a frequency of an electromagnetic wave heating microwave.
Figure 2B:
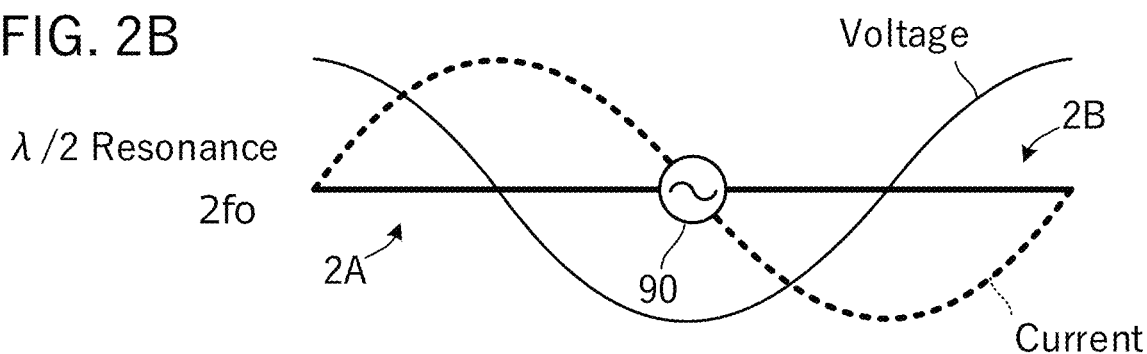
Figure 2C:
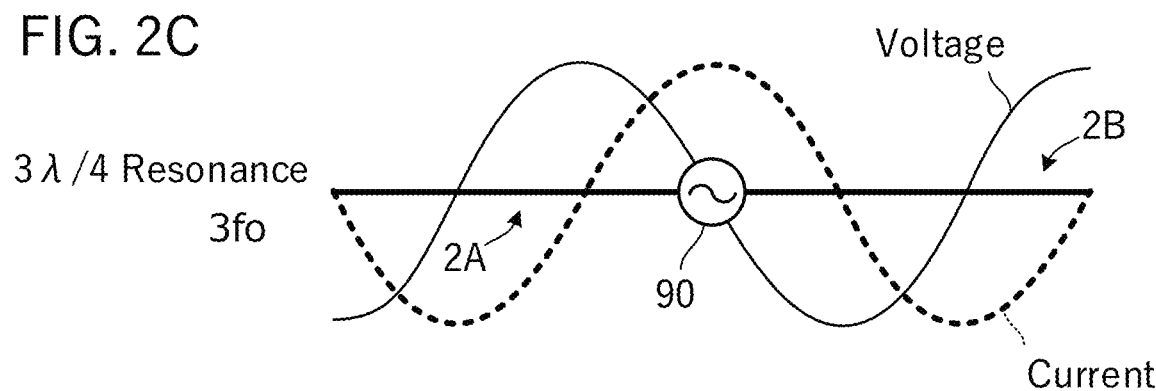
Figure 2D:
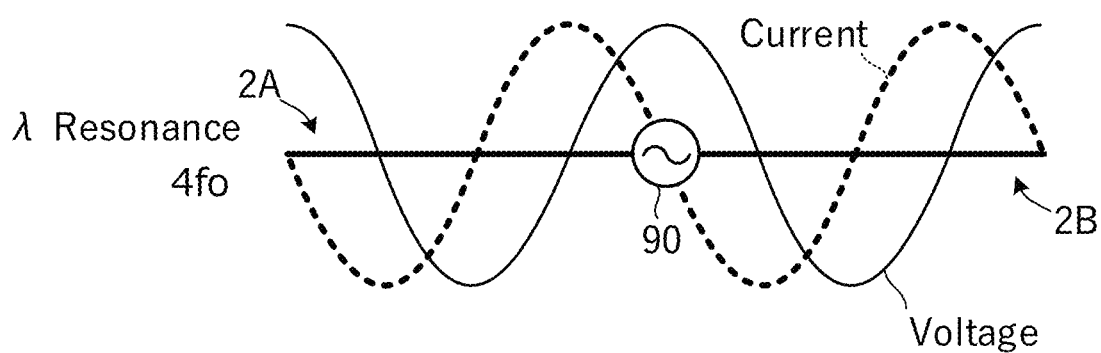

The dipole type antenna of the antenna patterns 2A, 2B resonates at the frequency of the communication signal, for example, at the quarter wavelength in FIG. 2A. Alternatively, the dipole type antenna resonates at the half wavelength in FIG. 2B. Under the condition that high-order resonance modes as shown in FIGS. 2B, 2C, and 2D are generated at the frequency of the electromagnetic wave heating microwave in the dipole type antenna, a large current is induced in the antenna patterns 2A, 2B by the high power of the microwaves, and heat is generated. However, as illustrated in FIG. 1B, the antenna patterns 2A, 2B are cut at an intermediate position thereof, so that the antenna patterns 2A, 2B are substantially shortened, and the resonance is not generated at the frequency of the electromagnetic wave heating microwave band. Thus, even when the irradiation of the electromagnetic wave heating microwave continues, the resonance current due to the microwave does not flow in the antenna patterns 2A, 2B, the temperature rise is stopped, and the ignition (combustion) does not occur.

FIGS. 3A, 3B, 3C, and 3D are partial sectional views illustrating an example of a positional relationship of the discharge auxiliary electrode 19 with respect to the loop-shaped conductor 20.

Figure 3A:
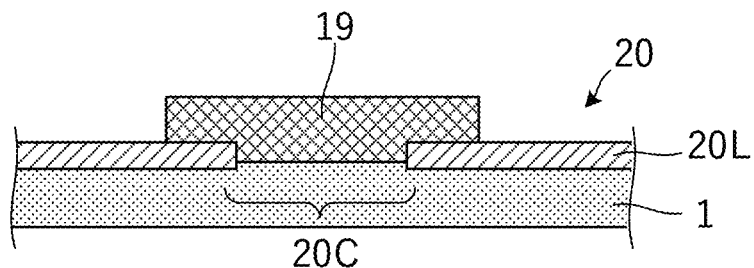
FIGS. 3A, 3B, 3C, and 3D are partially sectional views illustrating an example of a positional relationship of a discharge auxiliary electrode 19 with respect to a loop-shaped conductor 20.

In the example of FIG. 3A, the loop-shaped conductor 20 is provided on a top surface of the base material 1, and the discharge auxiliary electrode 19 is provided on the top surface of the base material 1 so as to cover the open portion 20C of the loop-shaped conductor 20. According to the exemplary aspect, the discharge auxiliary electrode 19 is in a form of paste before printing, and is formed by baking or heating and drying of the paste after printing.

Figure 3B:
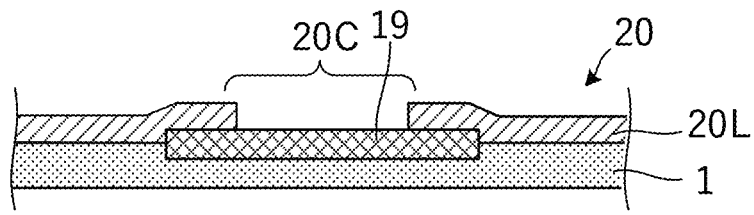

In the example of FIG. 3B, the discharge auxiliary electrode 19 is provided at a predetermined place of the base material 1, and the loop-shaped conductor 20 is provided on the base material 1 and the discharge auxiliary electrode 19. Moreover, the discharge auxiliary electrode 19 is also in the form of paste before printing, and is formed by baking or heating and drying of the paste after printing.

Figure 3C:
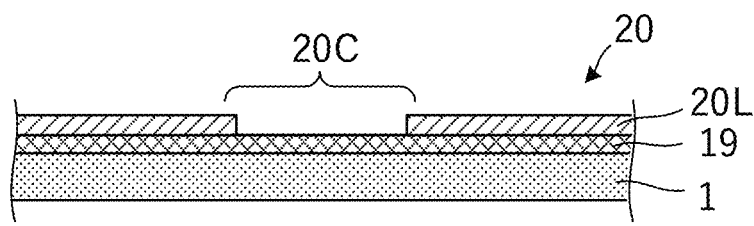

In the example of FIG. 3C, the discharge auxiliary electrode 19 spreading in a planar shape is provided on the top surface of the base material 1, and the loop-shaped conductor 20 is provided on the top surface of the discharge auxiliary electrode 19. The discharge auxiliary electrode 19 is previously formed into a sheet shape, and is formed by attaching the discharge auxiliary electrode 19 to the top surface of the base material 1 or by printing as described above. The discharge auxiliary electrode 19 is not locally provided at the open portion 20C of the loop-shaped conductor 20, but may be spread in a planar shape on the base material 1 as illustrated in FIG. 3C. The discharge auxiliary electrode 19 may be provided on the entire top surface of the base material 1. In the power during the communication, the voltage reaching the discharge start voltage is not induced in the open portion 20C of the loop-shaped conductor 20, namely, the electric field strength of the open portion 20C does not reach a strength at which the dielectric breakdown occurs, so that the discharge auxiliary electrode 19 does not affect the antenna patterns 2A, 2B. Thus, even when the discharge auxiliary electrode 19 is provided on the entire top surface of the base material 1, the antenna patterns 2A, 2B act as a normal radiation element.

Figure 3D:
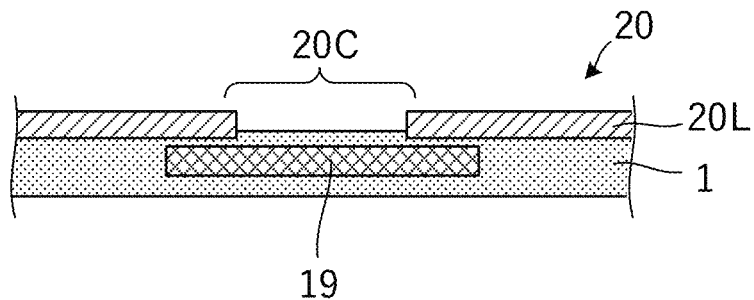

In the example of FIG. 3D, the discharge auxiliary electrode 19 is provided within the base material 1. However, the discharge auxiliary electrode 19 is close to the open portion 20C of the loop-shaped conductor 20 in a thickness direction. When the high voltage is applied to the open portion 20C, the high voltage is applied to a gap between the end of the conductor 20L and the discharge auxiliary electrode 19 to generate the dielectric breakdown, so that the discharge auxiliary electrode 19 may not directly make contact with the conductor 20L.

In the examples of FIGS. 1A, 3A, 3B, and 3D, the discharge auxiliary electrode 19 overlaps apart of the loop-shaped conductor 20 in planar view. Alternatively, the discharge auxiliary electrode 19 may not overlap the loop-shaped conductor 20 in planar view, and may be provided at a position close to the open portion 20C of the loop-shaped conductor 20 in planar view. Also in this structure, the discharge at the discharge position is controlled with the discharge auxiliary electrode 19, and the antenna patterns 2A, 2B can be cut quickly.

In the present embodiment, the loop-shaped conductor 20 is configured such that the LC resonance frequency of the loop-shaped conductor 20 coincides with the frequency of electromagnetic wave heating microwave. However, the effect of providing the loop-shaped conductor 20 is obtained even when the LC resonance frequency of the loop-shaped conductor 20 does not coincide with the frequency of the electromagnetic wave heating microwave. That is, the open portion 20C of the loop-shaped conductor 20 has a narrow distance between the patterns (gap). Thus, when the loop-shaped conductor 20 is subjected to the high-power electromagnetic wave heating microwave, the electric field strength in the gap is high, and the dielectric breakdown in the gap is easily generated as compared with other places. For this reason, the discharge is quickly started in the open portion 20C immediately after the irradiation of the electromagnetic wave heating microwave band is started.

Second Exemplary Embodiment

In a second exemplary embodiment, an RFID tag in which the shapes of the antenna pattern and the loop-shaped conductor are different from those of the first embodiment will be described.

Figure 4A:
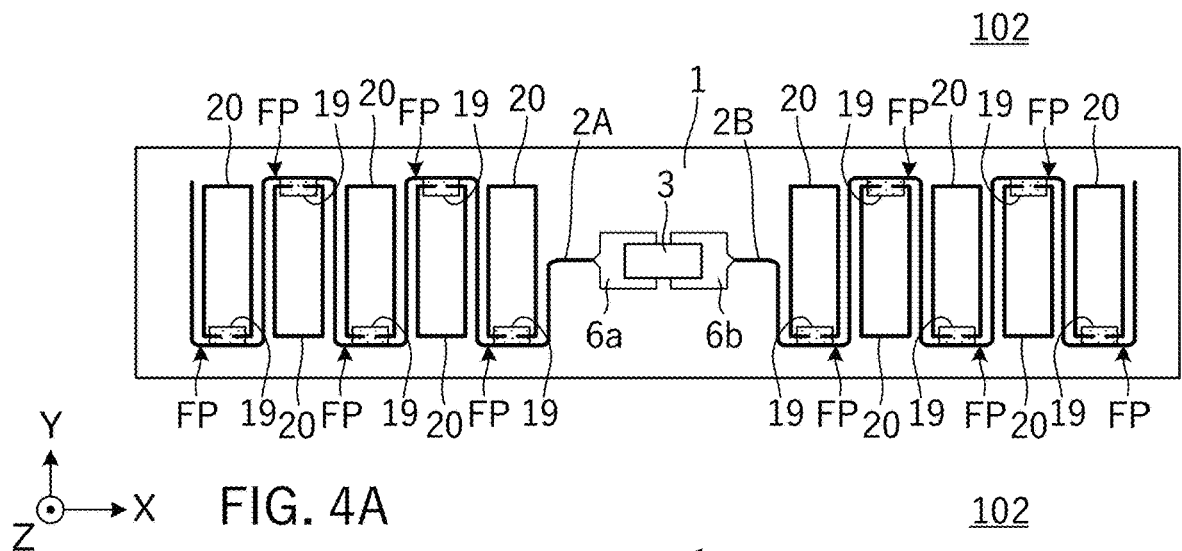
FIG. 4A and FIG. 4B are plan views illustrating an RFID tag 102 according to a second exemplary embodiment.
Figure 4B:
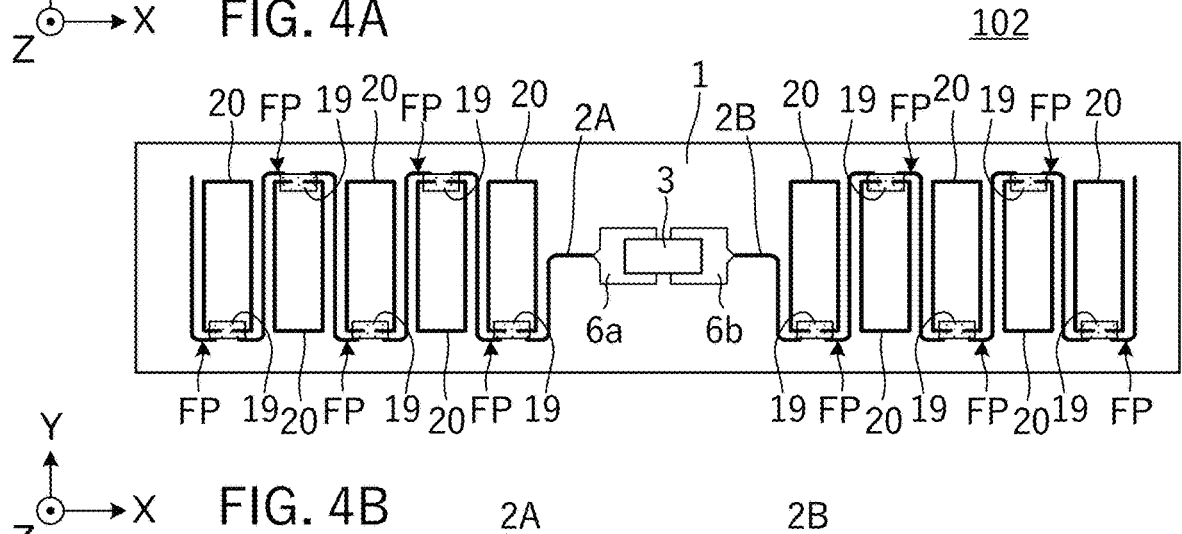
Figure 4C:
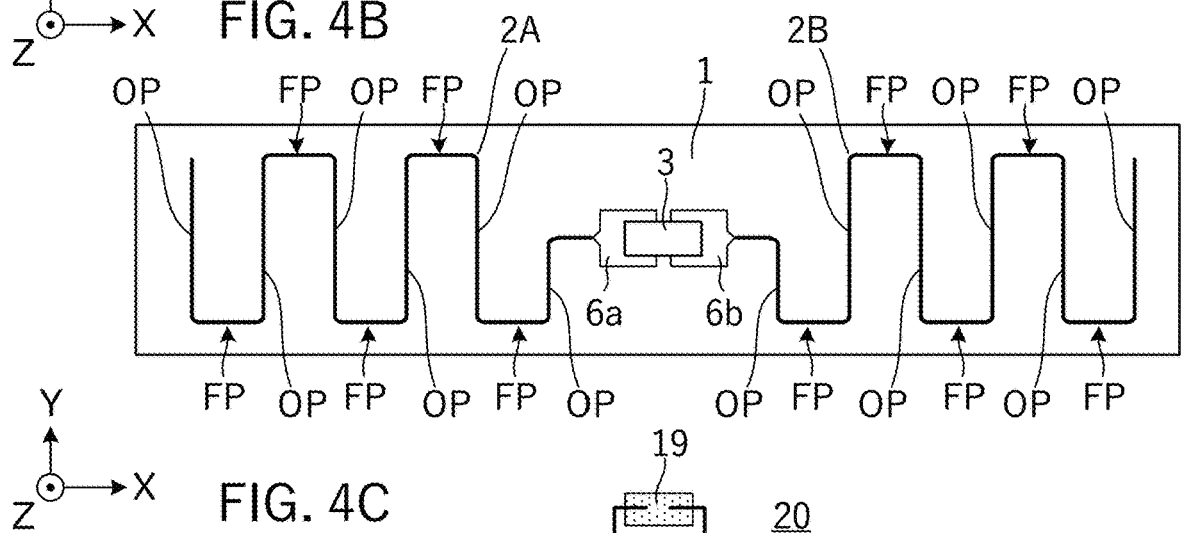
FIG. 4C is a plan view illustrating an RFID tag as a comparative example in which the loop-shaped conductor does not exist.
Figure 4D:
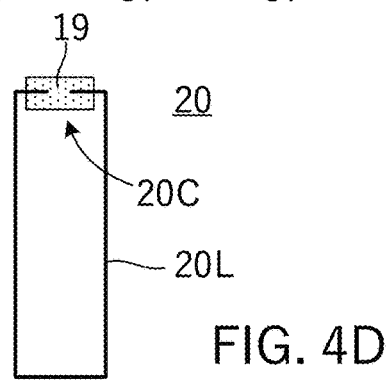
FIG. 4D is an enlarged plan view of a loop-shaped conductor 20.

FIGS. 4A and 4B are plan views illustrating the RFID tag 102 according to the second embodiment, and FIG. 4C is a plan view illustrating an RFID tag as a comparative example in which the loop-shaped conductor does not exist. FIG. 4D is an enlarged plan view of the loop-shaped conductor 20.

The RFID tag 102 in FIGS. 4A and 4B includes the base material 1 made of an insulator or a dielectric, the antenna patterns 2A, 2B provided on the base material 1, and the RFIC package 3 connected to the antenna patterns 2A, 2B. A plurality of loop-shaped conductors 20 are provided on the base material 1.

As illustrated in FIG. 4C, the antenna patterns 2A, 2B have a meandering line shape and are each configured to extend, with the first antenna pattern 2A having the meandering line shape that meanders from a first land pattern 6a on which the RFIC package 3 is mounted while including a plurality of folded portions FP, and with the second antenna pattern 2B having the meandering line shape that meanders from a second land pattern 6b on which the RFIC package 3 is mounted while including a plurality of folded portions FP. That is, the first antenna pattern 2A having the meandering line shape extends from the first land pattern 6a toward one end in a longitudinal direction of the base material 1 (e.g., in a −X-direction). The second antenna pattern 2B having the meandering line shape extends from the second land pattern 6b toward the other end in the longitudinal direction of the base material 1 (e.g., in a +X-direction).

With the above configuration, the antenna patterns 2A, 2B are configured and act as a dipole type electric field antenna.

The folded portions FP of the antenna patterns 2A, 2B are places where the extending direction of each of the antenna patterns 2A, 2B is reversed. The antenna patterns 2A, 2B include opposed portions OP which are opposed to each other by being folded back at the folded portions FP.

In the antenna patterns 2A, 2B, a pattern spacing portion is provided between the opposed portions OP adjacent to each other, and the loop-shaped conductor 20 is disposed between the plurality of pattern spacing portions. The RFID tag as the comparative example in FIG. 4C does not include the loop-shaped conductor 20.

The loop-shaped conductor 20 of the second embodiment is constructed with the conductor 20L and an open portion 20C similarly to the loop-shaped conductor 20 in FIGS. 1A and 1B. In the loop-shaped conductor 20, an LC circuit is constructed with a stray capacitance component provided in the open portion 20C and an inductance component of the conductor 20L.

Moreover, the discharge auxiliary electrode 19 is provided at a position to cover the open portion of the loop-shaped conductor 20 and at a position close to the folded portion FP of each of the antenna patterns 2A, 2B.

When the RFID tag 102 is irradiated with the electromagnetic wave heating microwave, the loop-shaped conductor 20 is subjected to the microwave, whereby a large potential difference is generated in the open portion 20C of the loop-shaped conductor 20. When the dielectric strength of the open portion 20C (i.e., the dielectric breakdown voltage between two opposed points of the conductor portion 20L) is exceeded, the dielectric breakdown is generated and the discharge is started in the open portion 20C.

When the RFID tag 102 is irradiated with the electromagnetic wave heating microwave, the loop-shaped conductor 20 is subjected to the microwave, whereby a large potential difference is generated in the open portion 20C of the loop-shaped conductor 20. When the dielectric strength of the open portion 20C is exceeded, the dielectric breakdown is generated, and the discharge is started at the open portion 20C.

When the discharge occurs in the open portion 20C, energy is concentrated on the discharge portion, so that the discharge portion has high heat, and the loop-shaped conductor 20, the antenna patterns 2A, 2B adjacent to the loop-shaped conductor 20, and the base material 1 are heated. The antenna patterns 2A, 2B and the base material 1 are heated, so that the antenna patterns 2A, 2B are melted and cut or sublimated and cut at the proximity position PP. FIG. 4B illustrates the state after the antenna patterns 2A, 2B are cut at the proximity position PP in this manner.

The RFID tag 102 configured as described above also provides the same effects as the RFID tag 101 of the first embodiment. In particular, because the open portions 20C of the loop-shaped conductors 20 adjacent to each other among the plurality of loop-shaped conductors 20 are not close to each other, the loop-shaped conductors 20 do not interfere with each other, but act independently. For this reason, stability of the cutting effect of the antenna patterns 2A, 2B by the discharge of the open portion 20C of the loop-shaped conductor 20 is obtained.

When the loop-shaped conductor 20 is disposed between the patterns opposed to each other in the antenna patterns 2A, 2B, it is not necessary to secure a region only for providing the loop-shaped conductor 20, and the overall size is not enlarged.

Figure 5:
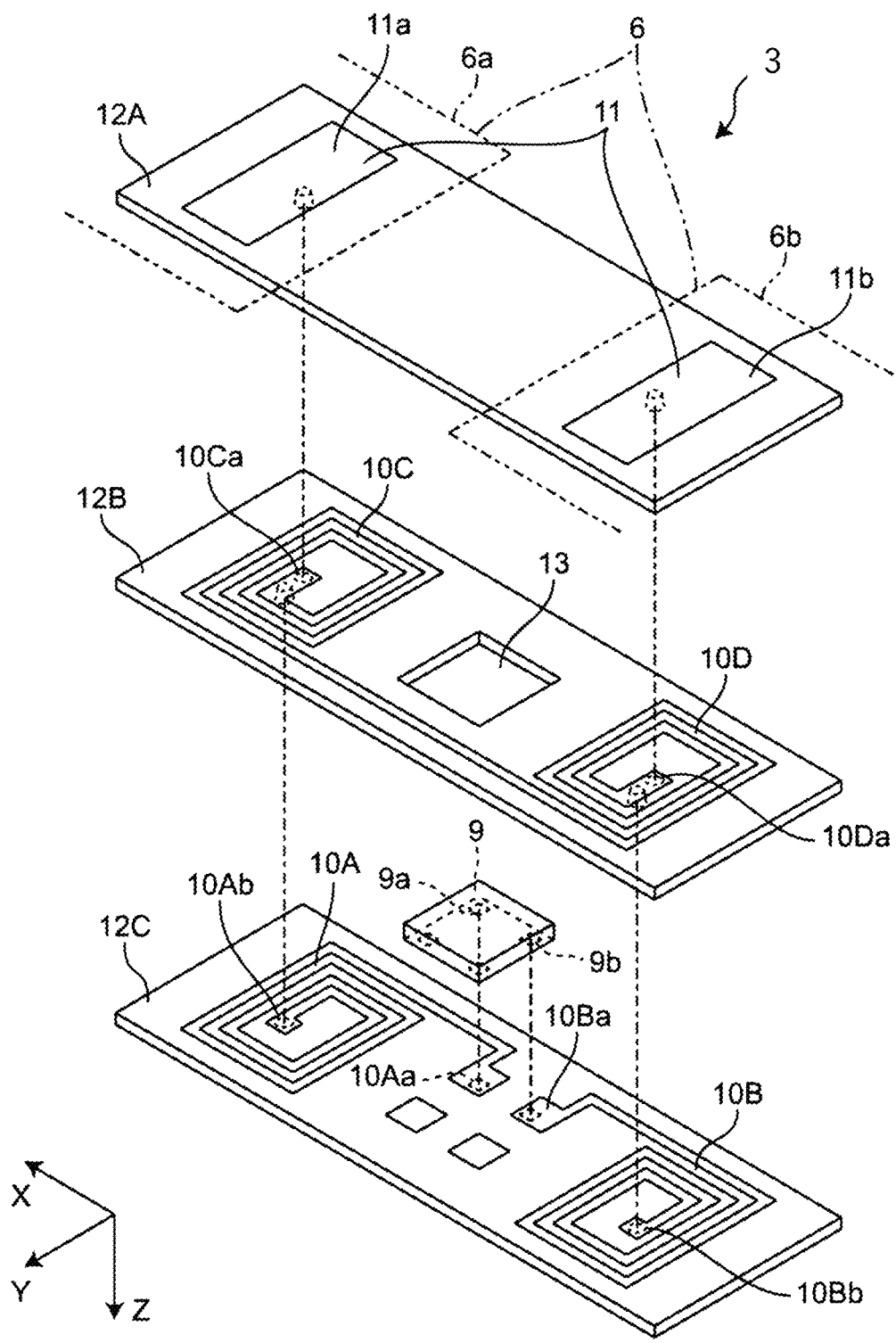
FIG. 5 is an exploded perspective view illustrating a configuration of an RFIC package 3 mounted on a land patterns 6 (6a, 6b) of antenna patterns 2A, 2B.

FIG. 5 is an exploded perspective view illustrating the configuration of the RFIC package 3 mounted on the land patterns 6 (i.e. patterns 6a, 6b) of the antenna patterns 2A, 2B. As illustrated in FIG. 5, the RFIC package 3 of the first embodiment is constructed with a multilayer substrate including three layers. Specifically, the multilayer substrate of the RFIC package 3 can be made of a resin material such as polyimide and a liquid crystal polymer, and is formed by laminating three flexible insulation sheets 12A, 12B, 12C. The insulation sheets 12A, 12B, 12C have a substantially quadrilateral shape in planar view, and have a substantially rectangular shape in the present embodiment. The RFIC package 3 in FIG. 5 illustrates a state in which the RFIC package 3 in FIG. 4A is turned over and the three layers are disassembled.

As illustrated in FIG. 5, in the RFIC package 3, an RFIC chip 9, a plurality of inductance elements 10A, 10B, 10C, 10D, and external connection terminals 11 (11a, 11b) connected to the antenna patterns 2A, 2B are provided at desired positions on three layered substrates (insulation sheets 12A, 12B, 12C).

The external connection terminals 11a, 11b are provided on the first insulation sheet 12A that forms a lowermost layer (the substrate opposed to the antenna patterns 2A, 2B), and at positions opposed to the land patterns 6a, 6b of the antenna patterns 2A, 2B. The four inductance elements 10A, 10B, 10C, 10D are separated into groups of two and provided on the second insulation sheet 12B and the third insulation sheet 12C. That is, the first inductance element 10A and the second inductance element 10B are provided on the third insulation sheet 12C that forms an uppermost layer (the layer described at the lowest position in FIG. 5), and the third inductance element 10C and the fourth inductance element 10D are provided on the second insulation sheet 12B that forms an intermediate layer.

In the RFIC package 3 of the present embodiment, the external connection terminals 11a, 11b and the four inductance elements 10A, 10B, 10C, 10D are constructed with a conductor pattern made of a conductive material such as an aluminum foil and a copper foil.

As illustrated in FIG. 5, the RFIC chip 9 is mounted on the third insulation sheet 12C, which forms the uppermost layer, in a central portion in the longitudinal direction (i.e., an X-direction in FIG. 5). The RFIC chip 9 has a structure in which an RF circuit is provided on a semiconductor substrate made of a semiconductor such as silicon. The first inductance element 10A formed into a spiral shape on one side (i.e., the side in the +X-direction in FIG. 5) in the longitudinal direction on the third insulation sheet 12C is connected to one input-output terminal 9a of the RFIC chip 9 through a land 10Aa. The second inductance element 10B formed into the spiral shape on the other side (i.e., the side in the −X-direction in FIG. 5) in the longitudinal direction on the third insulation sheet 12C is connected to the other input-output terminal 9b of the RFIC chip 9 through a land 10Ba.

The spiral-shaped third inductance element 10C is provided on one side (i.e., the side in the +X-direction in FIG. 5) in the longitudinal direction on the second insulation sheet 12B that forms the intermediate layer, and the spiral-shaped fourth inductance element 10D is provided on the other side (i.e., the side in the −X-direction in FIG. 5) in the longitudinal direction on the second insulation sheet 12B. The end on the outer peripheral side of the spiral-shaped third inductance element 10C and the end on the outer peripheral side of the spiral-shaped fourth inductance element 10D are directly connected to each other. On the other hand, a land 10Ca that is the end on an inner peripheral side of the third inductance element 10C is connected to a land 10Ab that is the end on the inner peripheral side of the spiral-shaped first inductance element 10A on the third insulation sheet 12C through an interlayer connection conductor, such as a via conductor, which penetrates the second insulation sheet 12B. The land 10Ca that is the end on the inner peripheral side of the third inductance element 10C is connected to the first external connection terminal 11a on the first insulation sheet 12A through an interlayer connection conductor, such as a through-hole conductor, which penetrates the first insulation sheet 12A that forms the lowermost layer.

As further shown, t land 10Da that is the end on the inner peripheral side of the fourth inductance element 10D is connected to a land 10Bb that is the end on the inner peripheral side of the spiral-shaped second inductance element 10B on the third insulation sheet 12C through an interlayer connection conductor, such as a through-hole conductor, which penetrates the second insulation sheet 12B. The land 10Da that is the end on the inner peripheral side of the fourth inductance element 10D is connected to the second external connection terminal 11b on the first insulation sheet 12A through an interlayer connection conductor, such as a through-hole conductor, which penetrates the first insulation sheet 12A that forms the lowermost layer.

The first external connection terminal 11a on the first insulation sheet 12A is disposed so as to be connected to a first land pattern 6a of the first antenna pattern 2A provided on the base material 1. The second external connection terminal 11b on the first insulation sheet 12A is disposed to be connected to a second land pattern 6b of the second antenna pattern 2B provided on the base material 1.

Moreover, a through-hole 13, in which the RFIC chip 9 mounted on the third insulation sheet 12C is accommodated, is provided in the second insulation sheet 12B that forms the intermediate layer. The RFIC chip 9 is disposed between the first inductance element 10A and the second inductance element 10B and between the third inductance element 10C and the fourth inductance element 10D. For this reason, the RFIC chip 9 functions as a shield, magnetic field coupling and electric field coupling between the first inductance element 10A and the second inductance element 10B are prevented, and similarly magnetic field coupling and electric field coupling between the third inductance element 10C and the fourth inductance element 10D are prevented. As a result, in the RFIC package 3, a passband of the communication signal is prevented from being narrowed, and the passband is widened.

In the present embodiment, the RFIC package 3 is mounted on the antenna patterns 2A, 2B. Alternatively, the RFIC chip 9 may directly be mounted on the antenna patterns 2A, 2B. In this case, the inductors configured as the plurality of inductance elements 10A, 10B, 10C, 10D in the RFIC package 3 may be configured on the base material 1 while having a loop-shaped pattern.

Figure 6:
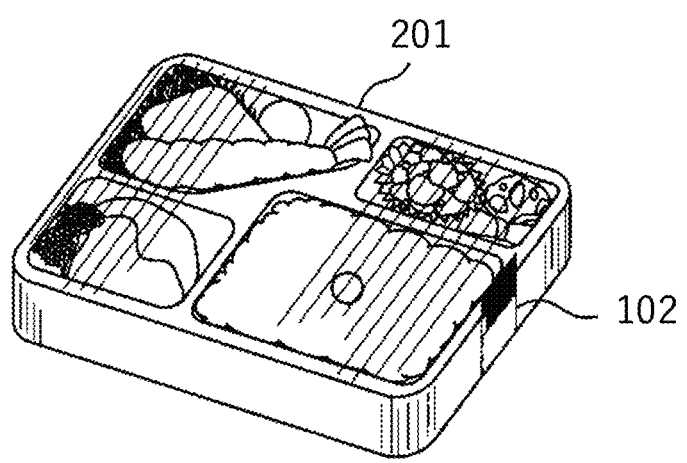
FIG. 6 illustrates an example of a product to which an RFID tag is attached, and is a perspective view illustrating a lunch box 201 to which the RFID tag 102 is attached.

FIG. 6 illustrates an example of a product to which the RFID tag is attached, and is a perspective view illustrating a lunch box 201 to which the RFID tag 102 is attached.

As described above, even when the lunch box 201 to which the RFID tag 102 is attached is heated by the microwave oven, the ignition of the RFID tag 102 and the melting and deformation of the wrapping film of the lunch box 201 to which the RFID tag 102 is attached can be prevented.

Third Exemplary Embodiment

In a third exemplary embodiment, an example of an RFID tag that does not include the loop-shaped conductor will be described.

Figure 7A:
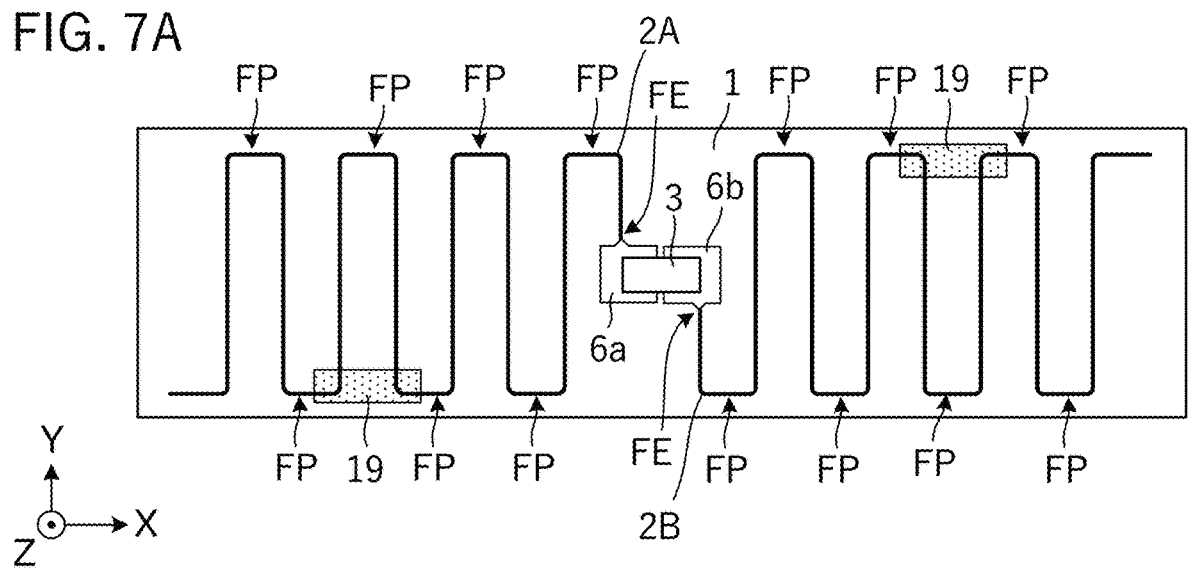
FIGS. 7A and 7B are plan views illustrating an RFID tag 103 according to a third exemplary embodiment.
Figure 7B:
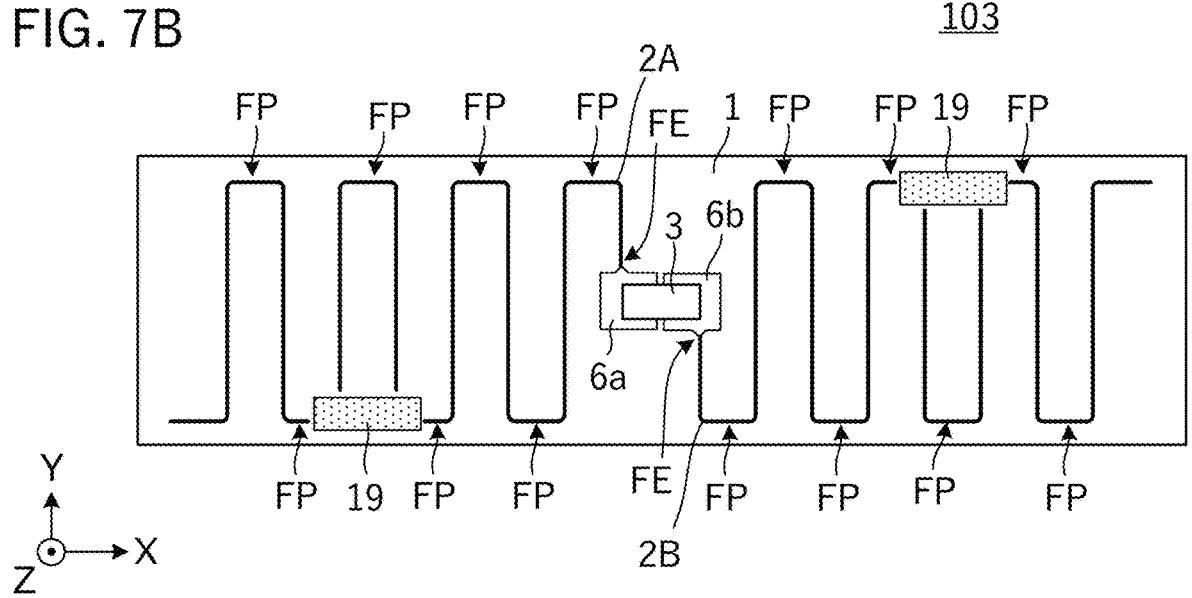

FIGS. 7A and 7B are plan views illustrating a RFID tag 103 according to the third exemplary embodiment.

As illustrated in FIG. 7A, the RFID tag 103 includes the base material 1 made of an insulator or a dielectric, the antenna patterns 2A, 2B provided on the base material 1, and the RFIC package 3 connected to the antenna patterns 2A, 2B. The discharge auxiliary electrode 19 is provided at a predetermined position on the base material 1.

As illustrated in FIGS. 7A and 7B, the antenna patterns 2A, 2B have a meandering line shape and are each configured to extend, with the first antenna pattern 2A having the meandering line shape that meanders from a first land pattern 6a on which the RFIC package 3 is mounted while including a plurality of folded portions FP, and with the second antenna pattern 2B having the meandering line shape that meanders from a second land pattern 6b on which the RFIC package 3 is mounted while including a plurality of folded portions FP. That is, the first antenna pattern 2A having the meandering line shape extends from the first land pattern 6a toward one end in a longitudinal direction of the base material 1 (i.e., in a −X-direction). The second antenna pattern 2B having the meandering line shape extends from the second land pattern 6b toward the other end in the longitudinal direction of the base material 1 (i.e., in a +X-direction).

With the above configuration, the antenna patterns 2A, 2B is configured and act as a dipole type electric field antenna.

The folded portions FP of the antenna patterns 2A, 2B are places where the extending direction of each of the antenna patterns 2A, 2B is reversed.

The discharge auxiliary electrode 19 is provided at a position to cover a part of the antenna patterns 2A, 2B.

When the RFID tag 103 is irradiated with the electromagnetic wave heating microwave, a large potential difference is generated between the folded portions FP adjacent to each other in the antenna patterns 2A, 2B. Because the place where the discharge auxiliary electrode 19 is provided has the low dielectric strength (i.e., the dielectric breakdown voltage between two different opposed portions on the conductor pattern), the dielectric breakdown is generated at this place first, and the discharge is started through the discharge auxiliary electrode 19.

When the discharge occurs, energy is concentrated on the discharge portion, so that the discharge portion has high heat, and the antenna patterns 2A, 2B and the base material 1 in the place coated with the discharge auxiliary electrode 19 are heated. The antenna patterns 2A, 2B and the base material 1 are heated, so that the antenna patterns 2A, 2B are melted and cut or sublimated and cut at the discharge portion. FIG. 7B illustrates the state after the antenna patterns 2A, 2B are cut in this manner.

As illustrated in FIG. 7B, when the antenna patterns 2A, 2B are cut, effective lengths of the antenna patterns 2A, 2B are shortened, and the resonance is not generated at the frequency of the electromagnetic wave heating microwave band. Thus, even when the irradiation of the electromagnetic wave heating microwave continues, a resonance current due to the microwave does not flow in the antenna patterns 2A, 2B, the temperature rise stops, and the ignition (combustion) does not occur.

As described herein, even when the loop-shaped conductor does not exist, discharge auxiliary electrode 19 can be provided at a position where the potential difference is relatively large and the adjacent distance is short, namely, at a position where the electric field strength is enhanced in the antenna patterns 2A, 2B.

In planar view, the discharge auxiliary electrode 19 may be disposed at a position close to the antenna patterns 2A, 2B while not overlapping the antenna patterns 2A, 2B. Also in this structure, the discharge auxiliary electrode 19 accelerates the discharge start at the discharge position, and the antenna patterns 2A, 2B can be cut quickly.

Fourth Exemplary Embodiment

In a fourth exemplary embodiment, an example of an RFID tag in which the discharge auxiliary electrode covers at least three places of the antenna pattern will be described.

Figure 8A:
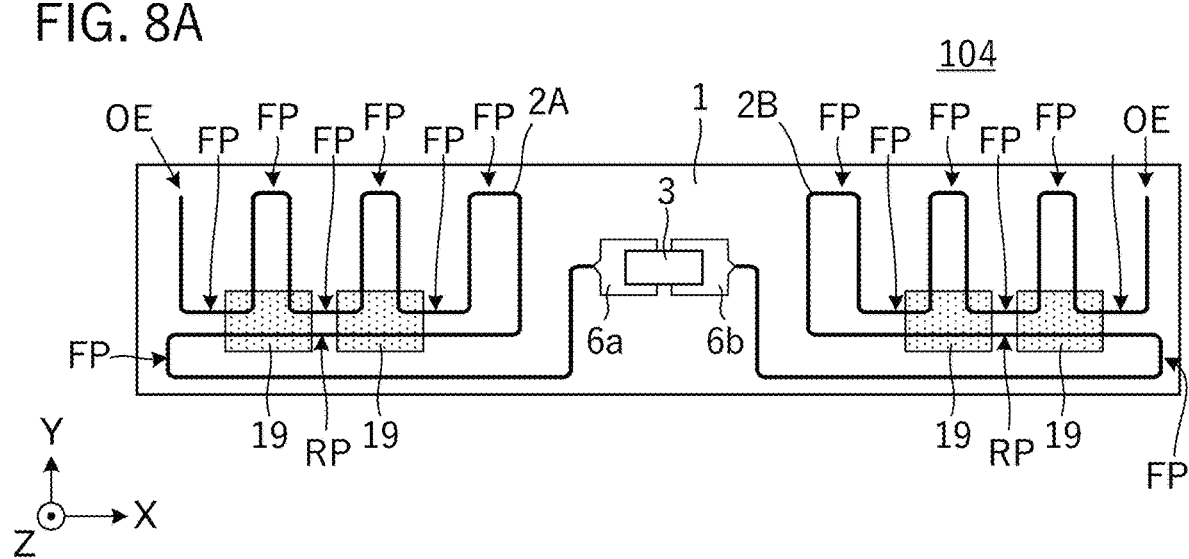
FIGS. 8A and 8B are plan views illustrating an RFID tag 104 according to a fourth exemplary embodiment.
Figure 8B:
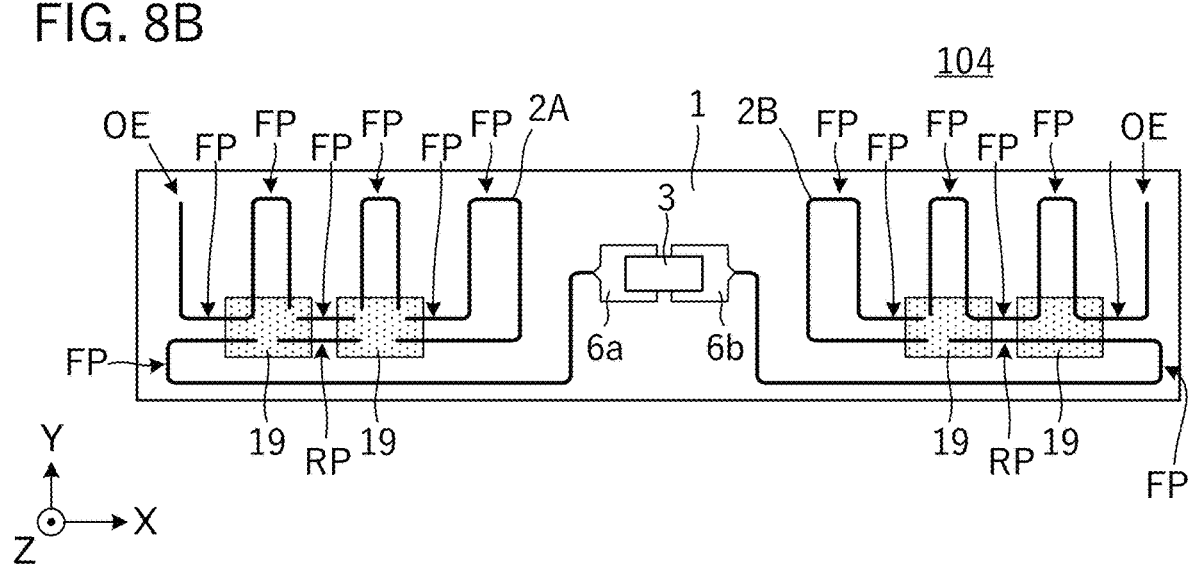

FIGS. 8A and 8B are plan views illustrating an RFID tag 104 according to the fourth embodiment.

As illustrated in FIG. 8A, the RFID tag 104 includes the base material 1 made of an insulator or a dielectric, the antenna patterns 2A, 2B provided on the base material 1, and the RFIC package 3 connected to the antenna patterns 2A, 2B. The discharge auxiliary electrode 19 is provided at a predetermined position on the base material 1.

As illustrated in FIGS. 8A and 8B, the antenna patterns 2A, 2B have a meandering line shape and are each configured to extend, with the first antenna pattern 2A having the meandering line shape that meanders from the first land pattern 6a on which the RFIC package 3 is mounted while including a plurality of folded portions FP and a reversion portion RP, and with the second antenna pattern 2B having the meandering line shape that meanders from the second land pattern 6b on which the RFIC package 3 is mounted while including a plurality of folded portions FP and a reversion portion RP. That is, the first antenna pattern 2A having the meandering line shape extends from the first land pattern 6a to the open end OE. The second antenna pattern 2B having the meandering line shape extends from the second land pattern 6b to the open end OE.

With the above configuration, the antenna patterns 2A, 2B are configured and act as a dipole type electric field antenna.

The discharge auxiliary electrode 19 is provided at a position to cover a part of the antenna patterns 2A, 2B. In particular, in the present embodiment, each of the plurality of discharge auxiliary electrodes 19 covers two adjacent folded portions FP, and covers a part of the reversion portion RP. The discharge auxiliary electrodes 19 are provided at a position where the potential difference is large in the antenna pattern and the distance in the surface direction is close. That is, the discharge auxiliary electrodes 19 are provided at the position where the electric field strength in two directions (i.e., the X-axis direction and the Y-axis direction) is high. That is, the electric field strength between the folded portions FP adjacent to each other in the X-axis direction is relatively higher than that at other places, and the electric field strength between the folded portion FP and the reversion portion RP adjacent to each other in the Y-axis direction is also relatively higher than that at other places.

When the RFID tag 104 is irradiated with the electromagnetic wave heating microwave, the electric field strength between the adjacent folded portions FP and between the folded portion FP and the reversion portion RP is increased in the antenna patterns 2A, 2B. Because the place where the discharge auxiliary electrode 19 is provided has the low dielectric strength (i.e., the dielectric breakdown voltage between two different opposed portions on the conductor pattern), the dielectric breakdown is generated at this place first, and the discharge is started through the discharge auxiliary electrode 19.

When the discharge occurs, energy is concentrated on the discharge portion, so that the discharge portion has high heat, and the antenna patterns 2A, 2B and the base material 1 in the place coated with the discharge auxiliary electrode 19 are heated. The antenna patterns 2A, 2B and the base material 1 are heated, and the antenna patterns 2A, 2B are melted and cut or sublimated and cut at the discharge portion. FIG. 8B illustrates the state after the antenna patterns 2A, 2B are cut in this manner.

As illustrated in FIG. 8B, when the antenna patterns 2A, 2B are cut, effective lengths of the antenna patterns 2A, 2B are shortened, and the resonance is not generated at the frequency of the electromagnetic wave heating microwave band. Thus, even when the irradiation of the electromagnetic wave heating microwave continues, a resonance current due to the microwave does not flow in the antenna patterns 2A, 2B, the temperature rise stops, and the ignition (i.e., combustion) does not occur.

As described above, when the discharge auxiliary electrode 19 is provided in the region continuous with the antenna patterns 2A, 2B and the area in which the reversion portion RP is provided, the number of places where the antenna patterns 2A, 2B can be cut by the heat generation due to the discharge is increased to efficiently cut the antenna patterns 2A, 2B.

Figure 9A:
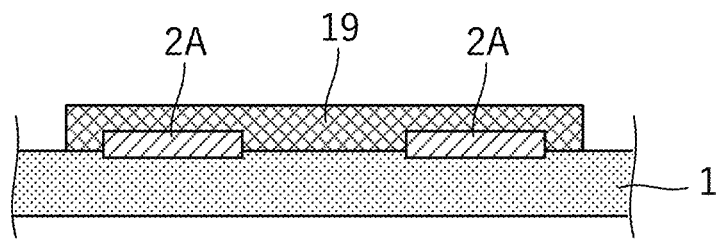
FIGS. 9A, 9B, and 9C are partially sectional views illustrating an example of the positional relationship of the discharge auxiliary electrode 19 with respect to the antenna pattern 2A.
Figure 9B:
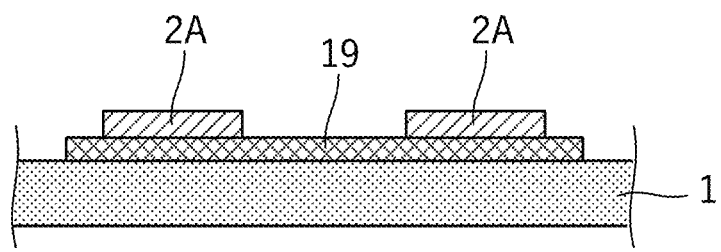
Figure 9C:
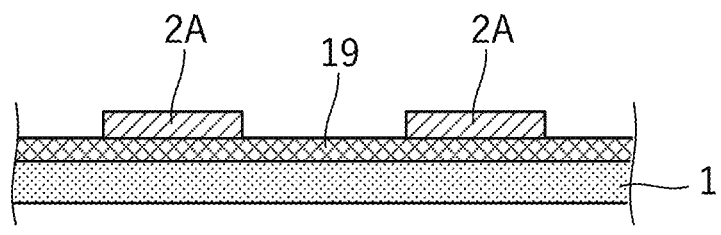

FIGS. 9A, 9B, and 9C are partially sectional views illustrating an example of the positional relationship of the discharge auxiliary electrode 19 with respect to the antenna pattern 2A.

In the example of FIG. 9A, the antenna pattern 2A is provided on the top surface of the base material 1, and the discharge auxiliary electrode 19 is provided on the top surface of the base material 1 so as to cover two portions of the antenna pattern 2A. The discharge auxiliary electrode 19 is in a form of paste before printing, and is formed by baking or heating and drying of the paste after printing.

In the example of FIG. 9B, the discharge auxiliary electrode 19 is provided at a predetermined place of the base material 1, and the antenna pattern 2A is provided on the base material 1 and the discharge auxiliary electrode 19. The discharge auxiliary electrode 19 is also in the form of paste before printing, and is formed by baking or heating and drying of the paste after printing.

In the example of FIG. 9C, the discharge auxiliary electrode 19 spreading in a planar shape is provided on the top surface of the base material 1, and the antenna pattern 2A is provided on the top surface of the discharge auxiliary electrode 19. The discharge auxiliary electrode 19 is previously formed into a sheet shape, and is formed by attaching the discharge auxiliary electrode 19 to the top surface of the base material 1 or by printing as described above. The discharge auxiliary electrode 19 is not locally provided at the antenna pattern 2A, but may spread in a planar shape on the base material 1 as illustrated in FIG. 9C. The discharge auxiliary electrode 19 may be provided on the entire top surface of the base material 1. With this structure, the antenna pattern is cut more quickly because the discharge quickly occurs at the place where the dielectric strength is weakest in the antenna pattern.

As illustrated in FIG. 9C, even when the discharge auxiliary electrode 19 is provided on the entire top surface of the base material 1, in the power during the communication, the electric field strength does not reach a strength at which the dielectric breakdown occurs even at a place of the antenna pattern 2A where the electric field strength is relatively high, so that the discharge auxiliary electrode 19 does not affect the antenna pattern 2A. Thus, even when the discharge auxiliary electrode 19 is provided on the entire top surface of the base material 1, the antenna pattern 2A acts as a normal radiation element.

In the structures in FIGS. 9A, 9B, and 9C, because the discharge position of the antenna pattern 2A is closest to the antenna pattern 2A, the thermal energy due to the discharge is efficiently transmitted to the antenna pattern 2A, so that the antenna pattern 2A is cut more quickly.

Although the antenna pattern 2A is illustrated in FIGS. 9A, 9B, and 9C, the same applies to the antenna pattern 2B.

Fifth Exemplary Embodiment

In a fifth exemplary embodiment, a loop-shaped conductor having a configuration different from that of the loop-shaped conductor of the RFID tag in the first exemplary embodiment or the second exemplary embodiment will be described.

Figure 10:
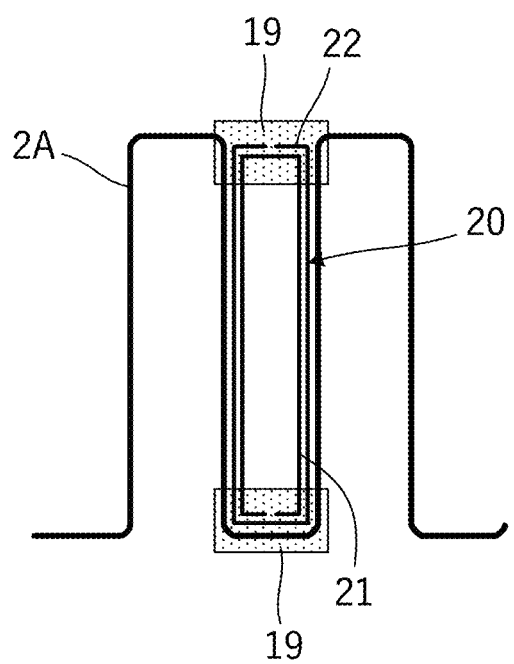
FIG. 10 illustrates a structure of a loop-shaped conductor 20 according to a fifth exemplary embodiment.

FIG. 10 illustrates a structure of a loop-shaped conductor 20 according to the fifth exemplary embodiment. As shown, the loop-shaped conductor 20 is constructed with two loop-shaped conductors 21, 22 one end of each of which is open. The open end of the loop-shaped conductor 21 and the open end of the loop-shaped conductor 22 are disposed on opposite sides to each other. In other words, the loop-shaped conductor 20 of the fifth embodiment is a duplexed split ring resonator. The discharge auxiliary electrode 19 is provided on both the open end of the loop-shaped conductor 21 and the open end of the loop-shaped conductor 22.

Figure 11:
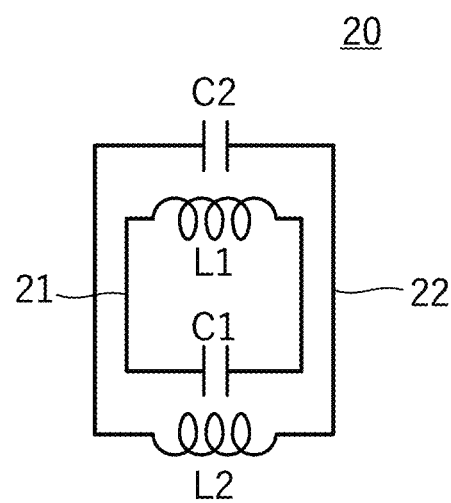
FIG. 11 is an equivalent circuit diagram of the loop-shaped conductor 20.

FIG. 11 is an equivalent circuit diagram of the loop-shaped conductor 20. Thus, the loop-shaped conductor 20 has the structure in which a resonance circuit constructed with an inductor L1 and a capacitor C1 and a resonance circuit constructed with an inductor L2 and a capacitor C2 are coupled to each other.

As illustrated in the present embodiment, the loop-shaped conductor pattern of the exemplary embodiments can be a set of a plurality of loop-shaped conductor patterns.

As described above, as illustrated in some embodiments, the antenna patterns 2A, 2B are cut at a middle position, so that the antenna patterns 2A, 2B do not resonate at the frequency of the electromagnetic wave heating microwave. the loop-shaped conductor 20 maybe disposed at a position where the resonance is not generated with the electromagnetic wave heating microwave by cutting the antenna pattern 2A, 2B or an area including the position. In particular, preferably, the loop-shaped conductor 20 is subjected to the electromagnetic wave heating microwave to generate the resonance, and therefore the heat is effectively generated.

The loop-shaped conductor 20 is not limited to that generating the fundamental resonance at the frequency of the electromagnetic wave heating microwave, but may be configured to generate the harmonic resonance.

It is noted that the loop-shaped conductor 20 can be provided only on one of the first antenna pattern 2A and the second antenna pattern 2B. Even in this case, when the antenna patterns 2A, 2B are cut at the proximity position PP of the loop-shaped conductor 20, the effective lengths of the antenna patterns 2A, 2B are shortened, and the resonance with the electromagnetic wave heating microwave is not maintained, and the heat generation of the antenna patterns 2A, 2B is stopped.

In the example of FIGS. 4A and 8A, the shapes of the first antenna pattern 2A and the second antenna pattern 2B of the RFID tags 102, 104 have a line symmetry relationship with respect to the feeding point (i.e., the position of the RFIC package 3). Alternatively, the shapes of the two antenna patterns 2A, 2B may have a point symmetry relationship with respect to the feeding point. The shapes of the two antenna patterns 2A, 2B may be asymmetric.

In the example of FIG. 7A, the shapes of the first antenna pattern 2A and the second antenna pattern 2B of the RFID tag 103 have a point symmetry relationship with respect to the feeding point (i.e., the position of the RFIC package 3). Alternatively, the shapes of the two antenna patterns 2A, 2B may have a line symmetry relationship with respect to the feeding point. The shapes of the two antenna patterns 2A, 2B may be asymmetric.

As described above, in each exemplary embodiment using a specific configuration, when a product to which an RFID tag is attached is heated by the electromagnetic wave heating device, ignition of the RFID tag and melting or deformation of members of the product to which the RFID tag is attached can be prevented. Thus, the exemplary embodiments of the present invention can provide the wireless communication device that can construct a system that automates accounting and packing of the purchased product in a shop, such as a convenience store, which handles a wide variety of products such as food items and household goods, and can make great advance toward the practical application of the "unmanned" convenience store.

Lastly, it is noted that the description of the above exemplary embodiments is illustrative in all respects but not restrictive. Modifications and changes can appropriately be made by those skilled in the art. Additionally, the scope of the exemplary embodiments of the present invention includes modifications of the embodiments within the scope equivalent to the scope of the claims.

The invention claimed is:

1. A wireless communication device for transmitting and receiving a communication signal, the wireless communication device comprising:
   a base material;
   a conductor pattern including an antenna pattern disposed above a surface of the base material; and
   a discharge auxiliary electrode disposed at a position to overlap or be adjacent to at least a portion of the antenna pattern in a plan view of the conductor pattern, with the discharge auxiliary electrode configured to lower a dielectric breakdown voltage between two different opposed portions on the conductor pattern,
   wherein the discharge auxiliary electrode is disposed at a position where a resonance of the antenna pattern in a frequency band of an electromagnetic wave heating microwave having power higher than power of the communication signal is stopped due to the antenna pattern being cut at a position adjacent to the discharge auxiliary electrode.

2. The wireless communication device according to claim 1, wherein a frequency of the communication signal is a UHF-band frequency, and a frequency of the electromagnetic wave heating microwave is a frequency ranging from 2.4 GHz to 2.5 GHz.

3. The wireless communication device according to claim 1, wherein the discharge auxiliary electrode is disposed at a position where an electric field strength is higher relative to other positions between portions of the antenna pattern, when the wireless communication device is subjected to irradiation of an electromagnetic wave heating microwave having power higher than power of the communication signal.

4. The wireless communication device according to claim 1, wherein the discharge auxiliary electrode completely covers a whole area where the antenna pattern is disposed in the plan view thereof.

5. The wireless communication device according to claim 1, wherein the conductor pattern further includes a loop-shaped conductor disposed adjacent to the antenna pattern, with the discharge auxiliary electrode being disposed to overlap or be adjacent to an open portion of the loop-shaped conductor in the plan view.

6. The wireless communication device according to claim 5, wherein the discharge auxiliary electrode is disposed in a region continuous with the antenna pattern and an area in which the loop-shaped conductor is disposed.

7. The wireless communication device according to claim 5, wherein the antenna pattern comprises a meandering line shape, and the loop-shaped conductor is disposed between mutually-opposed patterns of the antenna pattern.

8. The wireless communication device according to claim 1, wherein the discharge auxiliary electrode is disposed on the antenna pattern in the plan view thereof.

9. The wireless communication device according to claim 1, wherein the discharge auxiliary electrode is disposed on the base material and between the antenna pattern and the base material.

10. The wireless communication device according to claim 1, wherein the antenna pattern is configured to be cut when a high-frequency power is applied to the discharge auxiliary electrode, such that the discharge auxiliary electrode prevents ignition of the antenna pattern and the base material when the high-frequency power is applied thereto.

11. A wireless communication device for transmitting and receiving a communication signal, the wireless communication device comprising:
    a base material;
    a conductor pattern including an antenna pattern disposed above a surface of the base material; and
    a discharge auxiliary electrode disposed at a position to overlap or be adjacent to at least a portion of the antenna pattern in a plan view of the conductor pattern, with the discharge auxiliary electrode configured to lower a dielectric breakdown voltage between two different opposed portions on the conductor pattern,
    wherein the discharge auxiliary electrode comprises a film containing particulate conductive materials dispersed in an insulation material forming a base material.

12. The wireless communication device according to claim 11, wherein the particulate conductive materials are one of metal particles and semiconductor particles.

13. A wireless communication device for transmitting and receiving a communication signal, the wireless communication device comprising:
    a base material;
    a conductor pattern including an antenna pattern disposed above a surface of the base material and a loop-shaped conductor; and a discharge auxiliary electrode disposed in an opening of the loop-shaped conductor and configured to lower a dielectric breakdown voltage between two opposed portions of the loop-shaped conductor, such that the antenna pattern is cut when a high-frequency power is applied to the discharge auxiliary electrode, wherein the discharge auxiliary electrode is disposed at a position where a resonance of the antenna pattern in a frequency band of an electromagnetic wave heating microwave having power higher than power of the communication signal is stopped due to the antenna pattern being cut at a position adjacent to the discharge auxiliary electrode.

14. The wireless communication device according to claim 13, wherein a frequency of the communication signal is a UHF-band frequency, and a frequency of the electromagnetic wave heating microwave is a frequency ranging from 2.4 GHz to 2.5 GHz.

15. The wireless communication device according to claim 13, wherein the discharge auxiliary electrode is disposed at a position where an electric field strength is higher relative to other positions between portions of the antenna pattern, when the wireless communication device is subjected to irradiation of an electromagnetic wave heating microwave having power higher than power of the communication signal.

16. The wireless communication device according to claim 13, wherein the antenna pattern comprises a meandering line shape, and the loop-shaped conductor is disposed between mutually-opposed patterns of the antenna pattern.

17. The wireless communication device according to claim 13, wherein the discharge auxiliary electrode is disposed on the antenna pattern in a plan view thereof.

18. The wireless communication device according to claim 13, wherein the discharge auxiliary electrode is disposed on the base material and between the antenna pattern and the base material.

* * * * *